(12) United States Patent
Villwock

(10) Patent No.: US 6,800,311 B2
(45) Date of Patent: Oct. 5, 2004

(54) PROCESS FOR PREPARING STARCH COATED POTATO PRODUCTS

(75) Inventor: Victor K. Villwock, Castle Rock, CO (US)

(73) Assignee: Penford Corporation, Bellevue, WA (US)

(*) Notice: Subject to any disclaimer, the term of this patent is extended or adjusted under 35 U.S.C. 154(b) by 399 days.

(21) Appl. No.: 10/060,636

(22) Filed: Jan. 30, 2002

(65) Prior Publication Data

US 2002/0172754 A1 Nov. 21, 2002

Related U.S. Application Data

(60) Provisional application No. 60/270,380, filed on Feb. 21, 2001.

(51) Int. Cl.⁷ .................... A23L 1/0522; A23L 1/216
(52) U.S. Cl. .................. 426/102; 426/289; 426/295; 426/302; 426/637
(58) Field of Search ............... 426/102, 289, 426/295, 302, 637, 661

(56) References Cited

U.S. PATENT DOCUMENTS

| | | |
|---|---|---|
| 3,597,227 A | 8/1971 | Murray et al. |
| 3,751,268 A | 8/1973 | Van Patten et al. |
| 4,272,553 A | 6/1981 | Bengtsson et al. ........... 426/421 |
| 4,317,842 A | 3/1982 | El-Hag et al. .............. 426/302 |
| 4,931,296 A | 6/1990 | Shanbhag et al. .......... 426/243 |
| 4,931,298 A | 6/1990 | Shanbhag et al. .......... 426/296 |
| 5,059,435 A | 10/1991 | Sloan et al. ................. 426/102 |
| 5,141,759 A | 8/1992 | Sloan et al. ................. 426/102 |
| 5,279,840 A | 1/1994 | Baisier et al. .............. 426/102 |
| 5,302,410 A | 4/1994 | Calder et al. ............... 426/637 |
| 5,393,552 A | 2/1995 | Busacker et al. ........... 426/637 |
| 5,431,944 A | 7/1995 | Melvej ....................... 426/552 |
| 5,520,942 A | 5/1996 | Sauer, Jr. et al. ........... 426/289 |
| 5,648,110 A | 7/1997 | Wu et al. .................... 426/102 |
| 5,750,168 A | 5/1998 | Woerman et al. ........... 426/102 |
| 5,885,639 A | 3/1999 | Judkins et al. |
| 5,897,898 A | 4/1999 | Rogols et al. .............. 426/102 |
| 6,054,154 A | 4/2000 | Wang .......................... 426/92 |
| 6,080,434 A | 6/2000 | Horn et al. |
| 6,180,159 B1 | 1/2001 | Villagran et al. |
| 6,187,351 B1 | 2/2001 | Porzio et al. |

FOREIGN PATENT DOCUMENTS

WO     WO 85/01188     3/1985

OTHER PUBLICATIONS

International Search Report, PCT/US02/02604, United States Searching Authority.

*Primary Examiner*—Arthur L. Corbin
(74) *Attorney, Agent, or Firm*—Marshall, Gerstein & Borun LLP

(57) ABSTRACT

The present invention provides a process for preparing a potato product with a film-like coating on the outer surface according to the steps of: cutting the potatoes; blanching the potatoes; and coating the potatoes with a dry coating composition comprising at least 50% by weight dextrin and from 5% to 25% by weight of a hydrolyzed starch characterized by a DE of from 0.2 to 5. The method provides coated potato products (french fries) characterized by desirable textural properties at low coating weights.

16 Claims, No Drawings

PROCESS FOR PREPARING STARCH COATED POTATO PRODUCTS

This application claims benefit of U.S. Provisional Application Ser. No. 60/270,380 filed Feb. 21, 2001.

BACKGROUND OF THE INVENTION

The present invention relates generally to coated potato products and formulations and methods for coating potato products such as frozen french fries.

Methods for preparing and applying coatings to the outer surfaces of frozen potato products are well known in the art. Murray et al. U.S. Pat. No. 3,597,227 disclose a process in which raw potato strips are coated in a hot aqueous solution of modified gelatinized amylose derived from corn or potato starch. The process is said to produce a finished product which has superior strength and rigidity. Van Patten et al., U.S. Pat. No. 3,751,268 disclose the coating of blanched potato pieces with an ungelatinized unmodified high amylose starch having an amylose content of at least 50 percent. The coated potato strips are deep fat fried during which the starch in the coating is gelatinized.

El-Hag et al. U.S. Pat. No. 4,317,842 discloses the process of dipping blanched potato strips in an aqueous ungelatinized starch slurry to coat the strips, which are next soaked in hot oil to gelatinize the starch in the coating. The strips are then parfried and frozen. The strips may be reheated for consumption by heating in an oven rather than by deep fat frying.

Lenchin et al., WO 85/01188 disclose batters comprising the flour of high amylose corn hybrids for producing microwaveable pre-fried foodstuffs. The use of flours of high amylose corn hybrids is said to provide pre-fried foodstuffs with improved crispness after microwave cooking which otherwise tends to make such products soggy.

Sloan et al., U.S. Pat. Nos. 5,059,435 and 5,141,759 disclose a process for preparing frozen coated potatoes wherein raw potatoes are washed, cut, blanched and partially dehydrated. The cut potatoes are then coated with an aqueous starch slurry comprising 15 to 35% by weight modified ungelatinized potato starch, 2 to 10% by weight modified ungelatinized corn starch, 2 to 10% by weight rice flour and other optional ingredients. The coated potato strips are parfried in oil and then frozen. The frozen strips are prepared for consumption by either finish frying in hot oil, or heating in an oven. The starch coating is said to enhance the holding quality of the ready to consume product and to improve the acceptability of the finished product by increasing the crispness of the outer surface, and helping to maintain the tenderness of the interior of the cut potato. In particular, the potato starch and corn starch are said to contribute crispness to the coating, and because they are not gelatinized prior to the parfrying step they decrease clumping of the strips during processing. The rice flour is said to provide a desirable tenderness in the finished product.

The Sloan patents teach the use of potato starches which have been modified through known chemical cross-linking processes in order to minimize sticking or clumping of the strips during processing, and coat the potato strips evenly. The Sloan patents disclose as preferred an ungelatinized chemically modified potato starch (K-1010, Penford Corporation, Richland, Wash.) which is crosslinked with phosphorus oxychloride (POCl$_3$) at an effective level of 980 ppm. (This starch is characterized by a Brabender Amylograph viscosity of 50–100 BU ("Brabender units") when measured at a 9% starch solids concentration for 15 minutes at 95° C.) A chemically modified ungelatinized cornstarch said to be preferred for use in conjunction with the above modified potato starch is said to be Flojel® 60 (National Starch and Chemical Corp., Bridgewater, N.J.) which is a hydrolyzed cornstarch said to contribute crispness to the coating and to produce an optimal result when present in the coating slurry at a concentration of between two and ten percent by weight.

Also of interest to the present application is the disclosure of co-owned U.S. Pat. No. 5,648,110 which discloses use of potato starches with selected crosslinking levels as preferred components of starch enrobing slurries. Specifically, the patent discloses that potato strips coated with an aqueous starch enrobing slurry having an as is solids content comprising not less than about 50% by weight of ungelatinized crosslinked potato starch characterized by a viscosity of from 200 to 1100 Brabender Units (BU) when measured at 9% solids concentration after 15 minutes at 95° C. (which corresponds to a crosslinking level of from 550 to 900 ppm using POCl$_3$) and from 10 to 25% by weight rice flour provide improved crispness and texture properties. Also of potential interest to the present application is U.S. Pat. No. 5,750,168 which is directed to starch enrobing slurries having a solids content comprising not less than 20% by weight ungelatinized crosslinked tapioca starch characterized by a crosslinking level of from 300 to 1000 ppm. The patent teaches the incorporation of rice flour as a component of the enrobing slurries at solids contents preferably ranging from 10% to 25%. Of further interest to the present invention is the disclosure of U.S. Pat. No. 5,897,898 which is directed to starch enrobing slurries having an as is solids content comprising at least 40% by weight of a hydrolyzed starch characterized by a DE of from 0.2 to 0.8.

Also of interest to the present application are the disclosures of Calder et al., U.S. Pat. No. 5,302,410 and Brusacker et al., U.S. Pat. No. 5,393,552 which relate to the use of hydrolyzed starch products such as dextrins and maltodextrins as components of aqueous enrobing slurries. Specifically, the patents disclose contacting blanched potato strips with an aqueous solution which contains from 3% to 12% by weight of a hydrolyzed starch product characterized by a DE less than 12 and preferably from about 2 to 10. The patents specifically disclose the use of maltodextrins having a DE of 6 and teach against the use of maltodextrins having DE values greater than 12 because such hydrolyzate products promote undesirable browning of the final product. The patents further teach that concentrations of the starch hydrolyzate products greater than 12% are undesirable because "at higher concentrations the surface of the potato strips become slightly tacky upon finish frying which promotes undesirable clumping of the potato strips."

Of further interest to the present invention is the disclosure of Melvej, U.S. Pat. No. 5,431,944 which discloses a dry batter mix for french fries comprising from about 1.5% to about 9% by weight of a leavening agent and from about 5% to about 40% by weight of a starch blend comprising a high amylose starch, a starch, from about 1% to about 8% by weight dextrin wherein the weight percent in the batter mix is inversely related to the weight percent of the leavening agent, and about 0.1% to about 2% of a food gum. The specification teaches that the batter mix preferably includes about 2% to about 6%, by weight of dextrin and that the dextrin "provides a tender bite and in improved mouthfeel to the reconstituted food product." The patent further teaches that "[t]he particular amount of dextrin included in the batter mix is inversely related to the amount of leavening agent present in the batter mix. Therefore, as the amount of leavening agent in the batter is increased, the amount of dextrin in the batter mix is decreased, and vice versa. The dextrin mitigates the effects of the leavening agent and provides a more tender crispness. However, if too much dextrin is included in the batter mix, the reconstituted food product has a greasy mouthfeel." (Col. 7, lines 18–30).

Of interest to the present invention are the disclosures of patents which relate to methods of applying starch coatings to potato strips in a dry form. Bengtsson et al., U.S. Pat. No. 4,272,553 discloses a coating process which includes applying a dry coating directly onto the surface of a vegetable such as a potato to be fried as a method of absorbing the water from the cut potato. The patent discloses that the coating may be formed from a variety of materials including wheat or other cereal flours, soy or other oil seed flours, natural or modified starches from various raw materials, potato granules, potato flakes and potato fibers. The patent teaches the steps of (1) cutting the vegetable, (2) applying the dry coating, (3) blanching the coated vegetable, and (4) parfrying the vegetable.

Shanbhag et al., U.S. Pat. Nos. 4,931,296 and 4,931,298 disclose alternative processes for preparation of french fried potatoes for reheating in microwave ovens. According to a first method potatoes are (1) cut, (2) blanched, (3) parfried, and (4) dust-coated with potato granules having 90–95% of its granules at U.S. 40 mesh and which include no more than 8 percent moisture. According to an alternative procedure, potatoes are (1) cut, (2) blanched, (3) dust-coated, and (4) then parfried.

Baisier et al., U.S. Pat. No. 5,279,840 discloses a method of producing reduced fat deep fried french fries comprising the steps of (1) cutting potatoes, (2) dust-coating the potatoes with a mixture of amylose and calcium ions such as in a calcium salt, (3) blanching the potatoes, and (4) parfrying the potatoes.

Also of interest to the present invention are methods known in the art for the electrostatic application of coating materials to the surface of food products. As one example, Wang, U.S. Pat. No. 6,054,154 discloses the use of an electrostatic coating apparatus to apply a food grade powder blend to a cooked, whole meat muscle product placed on an electrically grounded support in a coating chamber. Similarly, U.S. Pat. No. 5,520,942 discloses the use of an electrostatic coating system for the application of food additives mixed with supercritical fluid to products such as potato chips.

Despite the exhaustive quantity of research devoted to improving french fry coatings there remains a desire in the art to develop coating formulations that are inexpensive, readily applied and provide improved organoleptic qualities to the french fries.

SUMMARY OF THE INVENTION

The present invention provides improved methods for preparing a frozen potato product (french fry) with a film-like coating on the outer surface comprising the steps of: cutting the potatoes; blanching the potatoes; and coating the potatoes with a dry coating composition comprising at least 50% by weight dextrin and from 5% to 20% by weight of a hydrolyzed starch characterized by a DE of from 0.2 to 5. The dry coating composition may be applied by various means known to those of skill in the art including a rotating tumbler, a dry powder spray system, and an electrostatic spray system although the use of an electrostatic spray system is particularly preferred. The potato strips may be frozen prior to coating with the dry coating composition but are preferably frozen after coating. The dry coating compositions of the invention preferably comprise at least 60% and as much as 75% by weight or more dextrins. Dextrins useful for practice of the invention may be produced from any starch source including, but not limited to, corn, potato, wheat and tapioca.

The second component of the dry coating composition is a hydrolyzed starch which is present at a concentration of from 5% to 25% with a concentration of 15% being preferred. The hydrolyzed starch can be enzyme or acid thinned and can be a granular or pregelled starch but is preferably a pregelled starch which has been acid thinned. The hydrolyzed starch is characterized by a DE of from 0.2 to 5 but is preferably characterized by a DE of from 0.2 to 2 but is more preferably characterized by a DE of from 0.2 to 1.

Accordingly to one preferred aspect of the invention, a third component may be incorporated into the dry coating compositions of the invention which is a maltodextrin/glucose syrup solids characterized by a DE ranging from 15 to 25. (A starch hydrolyzate product is characterized as a maltodextrin if it has a DE of less than 20 while starch hydrolyzate product having a DE of 20 or greater is considered to be glucose syrup solids (also known as a "corn syrup solids.") The maltodextrin/glucose syrup solids component adds a crispy character which becomes more apparent at longer hold times and is preferably incorporated at a concentration of from 5% to 35%. The invention also provides coated potato products produced according to the above-described methods as well as the dry coating compositions themselves.

The methods of the present invention are particularly useful because they provide coated potato products with good organoleptic properties even when the coatings are applied as a thin dry powder at low coating pickup levels. While french fry coating compositions are typically be applied at pickup levels of 6% to 8% and higher to achieve satisfactory results, the dry coating compositions of the invention provide improved organoleptic properties to coated potato strips when applied at pickup levels of less than 4% by weight. According to one aspect of the invention, the dry coating compositions of the invention may be applied at coating pickup levels of less than 2% by weight and as low as from 0.2% and 1.0% by weight while still providing good crispness and other desirable organoleptic properties.

According to another aspect of the invention, it is found that the incorporation of an octenyl succinate modified starch into a dry or aqueous enrobing slurry coating composition for application to potato products (french fries) or other foods provides improvements in the organoleptic character of the coated product. Accordingly, the invention also presents improvements in methods of preparing a potato product with a film-like coating on the outer surface by coating the potato product with an aqueous enrobing slurry or dry coating composition, by incorporating an octenyl succinate modified starch into said aqueous enrobing slurry or dry coating composition. The invention also provides an aqueous enrobing slurry for preparing a potato product with a film-like coating comprising at least 50% by weight of a modified starch component including but not limited to a crosslinked starch or starch hydrolysis product including dextrins and an octenyl succinate modified starch, and a dry coating composition for preparing a potato product with a film-like coating comprising at least 50% by weight of a modified starch component including but not limited to a crosslinked starch or starch hydrolysis product including dextrins and an octenyl succinate modified starch.

DETAILED DESCRIPTION

The dry coating compositions of the invention are particularly useful because the ingredients used therein require less water to melt and develop a thin, crispy coating as compared to batter ingredients such as crosslinked starches, native starches, or cereal flours which are commonly used in higher coatweight batters. Dextrin, with 20% to 70% cold water solubility, makes up 50% or more of the dry powder blend. Other ingredients that may be used include those which melt easily into a continuous layer without excess water. These are distinguished from conventional enrobing slurry ingredients which typically never lose most of their particulate nature when static cooked, especially without excess water present.

Ingredients useful for practice of the invention include, but are not limited to: dextrins (pyrodextrins), maltodextrins, glucose syrup solids, hydrolyzed polysaccharides, and starches which have been structurally degraded by physical methods such as pregelatinized or jet cooked starches. Less than 15% of the formulation should consist of ingredients which are incapable of melting into a continuous layer without excess water. Such melting can be determined by microscopic examination. Birefringence of the formulation component after cooking is also relevant, but not conclusive, to melting. Thus, if a component is birefringent after cooking, it has not melted. Alternatively, the fact that a component is not birefringent does not mean that it has melted. Ingredients which are incapable of melting into a continuous layer without excess water include, but are not limited to, dextrose, salt, and components of leavening systems.

Acid hydrolyzed starch, preferably pregelatinized as opposed to granular starch, of 0.2–5 DE (more preferably 0.2 to 2 DE) also melts neatly into the thin continuous film, as described above. In particular, when the acid hydrolyzed starch is used at up to 25% of the dry powder by weight, it imparts strength to the coating and enhances crispiness. Further, maltodextrins or glucose syrup solids (15–25 DE) are suitable ingredients as defined above and when used form up to 35% of the powder, the finished product improves in tender crispiness of the coated potato product after it has been removed from the heat lamp. This property significantly extends the useful lifespan of the product, for example, in restaurants prior to being eaten by the consumer.

The use of hydrolyzed starches in aqueous slurries for coating of french fries is known in the art but hydrolyzed starches having Dextrose Equivalents (DEs) greater than 12 are generally not desired due to sticking problems and excessive browning of the final fried product. However, as used in this invention, the maltodextrin/glucose syrup solids impart a noticeable brown color only at the highest levels recommended by this invention. Even in those cases, its use is not necessarily unappealing depending upon the desired characteristics of the final product.

The methods and compositions of the invention avoid stickiness and other negative properties associated with dextrins because there is insufficient material on the surface to create a strong bond between fries. Consequently, any fries that are stuck together during parfrying are readily separated afterwards. This is contrary to previous observations in the art that the use of excess dextrin causes "a greasy mouthfeel."

The dry coating composition of the invention may be applied by several methods known to the art. Optimum performance of the coating is dependent upon the ability to apply the dry powder uniformly onto the fry surface. This can be accomplished by applying the powder using a rotating tumbler, a dry powder spray system, or a combination of both. In particular, electrostatic coating using a cationic electrode is particularly preferred for producing a fine powder spray to achieve a very light coating. The product can be coated at any point after the potato strips have been blanched as long as excessive surface moisture is not present. In particular, with this invention it is possible to coat fries which have already been parfried and frozen. This has some benefit for ease-of-handling since the surface moisture is frozen and because excessive stickiness or rub-off of coating onto processing equipment is less of a concern, as it could be with blanched fries with excess surface moisture.

EXAMPLE 1

According to this example, dry coating compositions comprising varying levels of potato dextrin (PenCling 720B, Penford Food Ingredients Co.); acid hydrolyzed potato starch characterized by a DE of 0.3 (PenBind 800, Penford Food Ingredients Co.); and maltodextrin characterized by a DE of 16.5–19.5 (Maltrin M180, Grain Processing Corp.) were combined in various concentrations in dry blend formulations designed to provide an extended tender crispiness at low coating levels (0.50–0.75%).

Frozen, parfried french fries were purchased from a local grocery store. Approximately 250 to 300 g of frozen fries were spread out onto a tared, wire-mesh tray. Abnormally small or misshapen fries were removed. The tray was transferred to a grounded stainless steel surface. The appropriate formulated powder was sprayed from an electrostatic coating gun to (Model "Pilot II" System, Kitto Coating Technologies Inc., Scottsdale, Ariz.) produce a fine mist over the tray. The electrostatic coater settings were: +76 kV charge, 210 kPa primary air pressure, and 100 kPa secondary air pressure. The charged powder particles were attracted to the french fries as they sought to ground themselves. While spraying at 0.75 sec intervals, the tray with the fries was rotated and the fries were flipped over onto a fresh tray to insure uniform surface coating. The fries were periodically flipped onto a clean, tared tray and evaluated for pickup until the correct weight of added powder was achieved.

The procedure was done quickly and the coated fries were immediately returned to the freezer and held there until ready to final fry and evaluate. Final frying was done at 375° F. in canola oil for 2 minutes and 45 seconds. The products were evaluated for crispness and toughness on a scale where 5 is considered the best and a score of 1 is considered the most unacceptable. The fries were placed under a heat lamp controlling the temperature at 60° C. immediately after frying. Panelists evaluated the fries at 5, 10, and 15 minutes after frying was complete. At the 10 minute mark, the heat lamp was turned off to simulate typical fast food restaurant practices.

The results for each sample were tabulated, averaged and ranked by their scores for either toughness or crispiness at 15 minutes and is presented in Table 1 below. The best performing formulations when taking both crispiness and toughness into consideration were 1D and 1E. Sample 1D, 1B, and 1I all demonstrated significant relative improvements at the 15 minute mark. Sample 1I is more hydrophobic in nature and may retard water migration into the coating thus showing promise as a specialty starch that could be added in small quantities to improve shelf life. All samples were significantly improved over sample 1F, which was the uncoated control.

TABLE 1

|  | 1A | 1B | 1C | 1D | 1E | 1F | 1G | 1H | 1I | 1J | 1K | 1L |
|---|---|---|---|---|---|---|---|---|---|---|---|---|
| Dextrin (PenCling 720B) | 65% | 75% | 75% | 75% | 65% | — | 75% | 75% | 75% | 25% | 25% | 25% |
| Acid Hydrolyzed Starch DE = 0.3 (PenBind 800) | 20% | 25% | — | 12.5% | 15% | — | — | — | — | — | — | — |
| Maltodextrin DE = 16.5–19.5 (Maltrin M180) | 15% | — | 25% | 12.5% | 20% | — | — | — | — | — | — | — |
| High Amylose Starch (Gelose 80) | — | — | — | — | — | — | 25% | — | — | 75% | — | — |
| High Amylose Starch (HiMaize) | — | — | — | — | — | — | — | 25% | — | — | 75% | — |
| Octenyl succinate modified starch | — | — | — | — | — | — | — | — | 25% | — | — | 75% |
| Percent Pickup | 0.58% | 0.60% | 0.56% | 0.69% | 0.59% | N/A | 0.52% | 0.62% | 0.56% | 0.49% | 0.50% | 0.55% |
| Toughness | 2.6 | 2.7 | 2.7 | 2.7 | 3.0 | 1.7 | 2.6 | 2.7 | 2.6 | 2.4 | 2.7 | 2.4 |
| Crispness | 2.8 | 3.1 | 2.7 | 3.3 | 3.0 | 1.7 | 2.7 | 2.7 | 3.2 | 2.3 | 2.8 | 2.5 |

EXAMPLE 2

According to this example, different maltodextrins/glucose syrup solids varying in solubility and dextrose equivalence were evaluated to ascertain how well they perform as a low moisture requiring component of a dry coating for french fries for use according to the invention. The target coating pickup weight was approximately 0.5% based upon the weight of uncoated fries.

Frozen, parfried french fries were purchased from a local grocery store. Approximately 250 to 300 g of frozen fries were spread out onto a tared, wire-mesh tray. Abnormally small or misshapen fries were removed. The tray was transferred to a grounded stainless steel surface. The appropriate formulated powder was sprayed from the electrostatic coating gun of Example 1 to produce a fine mist over the tray. The electrostatic coater settings were: +76 kV charge, 210 kPa primary air pressure, and 100 kPa secondary air pressure. The charged powder particles were attracted to the french fries as they sought to ground themselves. While spraying at 0.75 sec intervals, the tray with the fries was rotated and the fries were flipped over onto a fresh tray. The fries were periodically flipped onto a clean, tared tray and evaluated for pickup until the correct weight of added powder was achieved.

The procedure was done quickly and the coated fries were immediately returned to the freezer and held there until ready to final fry and evaluate. Final frying was done at 375° F. in canola oil for 3 minutes. The product was evaluated for crispness and toughness on a scale where 5 is considered the best and a score of 1 is considered the most unacceptable. The fries were placed under a heat lamp controlling the temperature at 60° C. immediately after frying. Panelists evaluated the fries at 5, 10, and 15 minutes after frying was complete. At the 10 minute mark, the heat lamp was turned off to simulate typical fast food restaurant practices.

The following chart shows the formulation information. The maltodextrins/glucose syrup solids were obtained from Grain Processing Corp. and freely distributed information of their solubility and DE specifications. PenCling® 720 is a low-solubility white dextrin made by heat and acid hydrolysis from native potato starch. It readily forms a stable, partially solubilized, suspension in cold water. Maltrin M520 is a fine powder corn maltodextrin having a DE of 9–12. The results for each sample were evaluated, averaged and ranked by their scores for either toughness or crispiness and are presented in Table 2 below. Samples with ingredients having DE's ranging between 15 and 25 and particularly between 16 and 20 became better in the overall rankings as the products aged to 15 minutes, whereas those with lower DE ingredients became lower ranked at 15 minutes. Most maltodextrins used at 100% performed poorly except M040.

TABLE 2

| Sample ID | Percent Pickup | Maltodextrin or Glucose Syrup (DE)/Solubility % | Maltodextrin or Glucose Syrup Solids Content | Dextrin Percent | Toughness | Crispness |
|---|---|---|---|---|---|---|
| 2A | 0.52% | (4–7)/17% | 100% (Maltrin M040) | 0% | 2.7 | 3.0 |
| 2B | 0.67% | (9–12)/28% | 100% (Maltrin M520) | 0% | 2.7 | 2.6 |
| 2C | 0.67% | (16.5–19.5)/68% | 100% (Maltrin M180) | 0% | 2.6 | 2.1 |
| 2D | 0.50% | (20–23)/68% | 100% (Maltrin M200) | 0% | 2.3 | 2.4 |
| 2E | 0.73% | (23–27)/60% | 100% (Maltrin M250) | 0% | 2.4 | 2.3 |
| 2F | N/A |  | 0% | 0% | 1.8 | 2.1 |
| 2G | 0.50% | (4–7)/17% | 25% (Maltrin M040) | 75% | 2.5 | 3.0 |
| 2H | 0.55% | (9–12)/28% | 25% (Maltrin M520) | 75% | 2.7 | 2.7 |
| 2I | 0.62% | (16.5–19.5)/68% | 25% (Maltrin M180) | 75% | 2.4 | 3.1 |
| 2J | 0.63% | (20–23)/68% | 25% (Maltrin M200) | 75% | 2.7 | 2.8 |
| 2K | 0.62% | (23–27)/60% | 25% (Maltrin M250) | 75% | 2.8 | 2.8 |
| 2L | N/A |  | 0% | 0% | 2.4 | 2.4 |
| 2M | 0.56% | (4–7)/17% | 75% (Maltrin M040) | 25% | 2.5 | 2.3 |
| 2N | 0.56% | (9–12)/28% | 75% (Maltrin M520) | 25% | 2.7 | 2.5 |

TABLE 2-continued

| Sample ID | Percent Pickup | Maltodextrin or Glucose Syrup (DE)/Solubility % | Maltodextrin or Glucose Syrup Solids Content | Dextrin Percent | Toughness | Crispness |
|---|---|---|---|---|---|---|
| 2O | 0.53% | (16.5–19.5)/68% | 75% (Maltrin M180) | 25% | 2.7 | 2.7 |
| 2P | 0.63% | (20–23)/68% | 75% (Maltrin M200) | 25% | 2.6 | 2.5 |
| 2Q | 0.75% | (23–27)/60% | 75% (Maltrin M250) | 25% | 2.5 | 2.7 |
| 2R | N/A | | | 0% | 2.3 | 2.0 |

EXAMPLE 3

According to this example, the use of binary blends of starches and dextrin for use in a dry, low-coatweight coating was evaluated. The ingredients were selected because of their ability to easily melt into the continuous phase with limited water during frying. Table 3, below, illustrates the formulations tested.

Frozen, parfried french fries were purchased from a local grocery store. Approximately 250 to 300 g of frozen fries were spread out onto a tared, wire-mesh tray. Abnormally small or misshapen fries were removed. The tray was transferred to a grounded stainless steel surface. The appropriate formulated powder was sprayed from the electrostatic coating gun of Example 1 to produce a fine mist over the tray. The electrostatic coater settings were: +76 kV charge, 210 kPa primary air pressure, and 100 kPa secondary air pressure. The charged powder particles were attracted to the french fries as they sought to ground themselves. While spraying at 0.75 sec intervals, the tray with the fries was rotated and the fries were flipped over onto a fresh tray. The fries were periodically flipped onto a clean, tared tray and evaluated for pickup until the correct weight of added powder was achieved.

The procedure was done quickly and the coated fries were immediately returned to the freezer and held there until ready to final fry and evaluate. Final frying was done at 375° F. in canola oil for 3 minutes and 30 seconds. The product was evaluated for crispness and toughness on a scale where 5 is considered the best and a score of 1 is considered the most unacceptable. The fries were placed under a heat lamp controlling the temperature at 60° C. immediately after frying. Panelists evaluated the fries at 10 minutes after frying at which point the heat lamp had been turned off. The following ingredients were used in formulations. PenBind 800 (PB800) is an acid hydrolyzed potato starch having a DE of 0.3. PB800* which was PenBind 800 starch which was jet-cooked and subsequently dried, ground, and screened back into a useful powder. PP40 is PenPlus 40 which is a crosslinked pregelatinized starch. PP300 is PenPlus 300 which is a lightly crosslinked acetylated pregelatinized potato starch. PC720 is PenCling 720 is a potato dextrin. PC205 is PenCling 205 is an oxidized potato starch. An uncoated control was also evaluated labeled here as "UC."

The best performing coatings both contained either acid hydrolyzed potato starch (PB800) or pregelatinized PB800 together with dextrin, although results compared with the ratio of acid hydrolyzed to amount of dextrin was not consistent between the two acid hydrolyzed starches. Most of the acid-hydrolyzed starch containing samples were at least slightly better than the control. The other pregelatinized and oxidized starches did not perform as well. The reason why pregelatinized starches tended to not perform well in dry coatings is that even though they are fully cooked, the granules still have a skin, or granular envelope which is even more prominent if crosslinked. The presence of this structure prevented the pregelatinized starch from truly melting into the continuous network of the coating. Oxidized starches have been shown to have good melting characteristics for dry coatings, but tend to soften the coatings due to peculiarities of their molecular structure.

TABLE 3

| | 3A | 3B | 3C | 3D | 3E | 3F | 3G | 3H | 3I | 3J | UC |
|---|---|---|---|---|---|---|---|---|---|---|---|
| PC720 | 25% | 75% | 25% | 75% | 25% | 75% | 25% | 75% | 25% | 75% | — |
| PB800 | 75% | 25% | — | — | — | — | — | — | — | — | — |
| PB800* | — | — | 75% | 25% | — | — | — | — | — | — | — |
| PP40 | — | — | — | — | 75% | 25% | — | — | — | — | — |
| PP300 | — | — | — | — | — | — | 75% | 25% | — | — | — |
| PC205 | | | | | | | | | 75 | 25% | — |
| % pickup | 0.57% | 0.59% | 0.50% | 0.54% | 0.58% | 0.67% | 0.54% | 0.68% | 0.62% | 0.51% | — |
| Crispness | 3.5 | 3 | 3 | 3.5 | 2 | 2 | 2 | 2.5 | 2 | 2.5 | 2 |
| Toughness | 3 | 2.5 | 2.5 | 3 | 3 | 2 | 2.5 | 2.5 | 2 | 2 | 2 |

EXAMPLE 4

According to this example, the relationship between coatweight and coating thickness in dry dusted french fries was explored. By dye-tagging the coating ingredients, they can easily be differentiated from the potato tissue underneath, which contains large quantities of starch that normally appear similar to starch in the applied coated. This study also tracks the changes in coating thickness as it is parfried, frozen, and then fried again. According to this example, a bucket dusting method was used coat the potato strips.

A model formulation of 75% crosslinked potato starch and 25% dextrin was used. Prior to the study, these ingredients were reacted with Procion Red MX5B, which is a dye which chemically bonds with starch and thus cannot bleed or transfer to other ingredients. The ingredients were thoroughly washed to remove unreacted dye, dried, and sieved to recover the ingredient again as a dry powder.

Potato strips were blanched for 8.5 minutes in water at 165° F., then dipped for 45 seconds in a brine dip consisting of 1.5% sodium chloride and 0.5% sodium acid pyrophosphate (SAPP 28), also at 165° F. The potato strips were then dried at 80° C. until a 10% moisture loss was achieved.

The blanched potato strips were loaded into a stainless steel bucket 100 g at a time and the dyed powder was added. Four levels were used: 2, 4, 6, and 8 g. The potato strips were tumbled until a uniform coating was achieved and no visible powder was visible in the bucket. The samples were then parfried in oil at 380° F. for 40 seconds, examined microscopically, and frozen. The products were later final fried at 360° F. for 2 minutes and 45 seconds and examined again. A second series was done identically only that 1.03% SAPP #4 and 0.77% sodium bicarbonate were added to the dry blend as leavening agents.

Microscopic evaluation included a surface examination at 100×power. A razor was used to cut away a cross-section of the fry which was then examined under low power with a stereoscope. A microcaliper was used to measure coating thickness. Evaluation of the products showed that coating thickness seemed to be thinner after final frying compared to parfrying. The texture of these fries was dry and papery, although leavening seemed to make the coating more airy. These dry dust formulations gave coatings which seemed to be thicker than wet batter formulations similarly measured previously. The wet batter formulation contained high amounts of crosslinked starch and rice flour, which when fried with excess water (as in wet batter application) were able to fully cook, swell, solubilize, and coat with better coverage and continuity. However, the crosslinked starch used in the present study did not have sufficient water available to it to cook-out and spread into a network and thus the coating was quite thick. Surface examination showed at the 6 and 8% pickup levels there was more of the red coating contacting other red regions. In other words, there was much more possibility for good coverage and network formation between particles. At 2 and 4% pickup, the red color appeared more "spotted" and discontinuous which supports the generally held theory that good crispy coatings are not obtainable at 4–5% pickup or lower. This effect was more evident in the parfried samples than in the final fried samples.

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A process for preparing a potato product with a film-like coating on the outer surface comprising the steps of:
   cutting the potatoes;
   blanching the potatoes; and
   coating the potatoes with a dry coating composition comprising at least 50% by weight dextrin and from 5% to 25% by weight of a hydrolyzed starch characterized by a DE of from 0.2 to 5.

2. The process of claim 1 wherein the dry composition comprises at least 60% by weight dextrin.

3. The process of claim 1 wherein the hydrolyzed starch is characterized by a DE of from 0.2 to 2.

4. The process of claim 1 wherein the hydrolyzed starch is an acid hydrolyzed starch.

5. The process of claim 4 wherein the acid hydrolyzed starch is a granular starch.

6. The process of claim 4 wherein the acid hydrolyzed starch is pregelatinized prior to acid hydrolysis.

7. The process of claim 1 wherein the composition further comprises from 5% to 25% of a maltodextrin/glucose syrup solids characterized by a DE of from 15 to 25.

8. The process of claim 1 wherein the dry coating composition is applied at a coating pickup weight of less than 4% based upon the weight of uncoated potato product.

9. The process of claim 1 wherein the dry coating composition is applied at a coating pickup weight of less than 2% by weight based upon the weight of uncoated potato product.

10. The process of claim 1 wherein the dry coating composition is applied at a coating pickup weight of less than 1% by weight based upon the weight of uncoated potato product.

11. The process of claim 1 wherein the potatoes are coated by means selected from the group consisting of a rotating tumbler, a dry powder spray system, and an electrostatic spray system.

12. The process of claim 11 wherein the potatoes are coated by means of an electrostatic spray system.

13. The process of claim 1 wherein the potatoes are frozen prior to application of the dry coating composition.

14. The process of claim 1 wherein the potatoes are frozen after application of the dry coating composition.

15. In a method of preparing a potato product with a film-like coating on the outer surface by coating the potato product with an aqueous enrobing slurry or dry coating composition, the improvement comprising:
   incorporating an octenyl succinate modified starch into said aqueous enrobing slurry or dry coating composition.

16. A coated potato product with a film-like coating produced according to the method of claim 15.

* * * * *